(12) United States Patent
Rains et al.

(10) Patent No.: US 6,857,833 B1
(45) Date of Patent: Feb. 22, 2005

(54) ENCLOSED CARGO CONTAINERS FOR HIGH MOUNT VEHICLE TRAILERS

(76) Inventors: Gregory A. Rains, 5839 Paneleen Ct., Cincinnati, OH (US) 45239; Morris Carter, Jr., Rte. 2, Box 2125, Starke, FL (US) 32901

( * ) Notice: Subject to any disclaimer, the term of this patent is extended or adjusted under 35 U.S.C. 154(b) by 0 days.

(21) Appl. No.: 10/321,698

(22) Filed: Dec. 18, 2002

(51) Int. Cl.$^7$ .............................. B60P 3/07; B60P 3/073; B60P 3/08
(52) U.S. Cl. .................. 410/4; 410/26; 410/7
(58) Field of Search .............................. 410/4, 24, 24.1, 410/26, 3, 30, 7, 8, 11, 12, 23, 104, 103, 106

(56) References Cited

U.S. PATENT DOCUMENTS

| 3,149,583 | A | * | 9/1964 | Morrill ........................ 414/522 |
| 3,785,514 | A | | 1/1974 | Forsyth et al. |
| 3,912,139 | A | * | 10/1975 | Bowman ........................ 410/3 |
| 4,078,821 | A | * | 3/1978 | Kitterman ................ 280/460.1 |
| 4,738,575 | A | * | 4/1988 | Blodgett et al. .............. 410/29 |
| 4,854,631 | A | | 8/1989 | Laursen |
| 4,949,772 | A | * | 8/1990 | Ballyns et al. .............. 160/201 |
| 4,966,510 | A | * | 10/1990 | Johnson, Jr. ................. 410/26 |
| 5,051,046 | A | * | 9/1991 | Oren ........................... 410/29.1 |
| 5,102,184 | A | * | 4/1992 | Cook ........................... 296/158 |
| 5,213,458 | A | * | 5/1993 | Preller et al. .................. 410/26 |
| 5,427,356 | A | * | 6/1995 | Krotov et al. .............. 354/324 |
| 5,564,723 | A | * | 10/1996 | Breeden et al. ............ 280/79.3 |
| 6,004,084 | A | * | 12/1999 | Moker ........................ 410/118 |
| 6,007,288 | A | * | 12/1999 | Maffett et al. .............. 414/281 |
| 6,099,232 | A | * | 8/2000 | Dixon et al. ................ 414/494 |
| 6,354,777 | B1 | * | 3/2002 | Riekki ........................... 410/3 |

FOREIGN PATENT DOCUMENTS

JP              406262976 A  *  9/1994   ................. 410/26

* cited by examiner

Primary Examiner—D. Glenn Dayoan
Assistant Examiner—H. Gutman
(74) Attorney, Agent, or Firm—Dowell & Dowell, P.C.

(57) ABSTRACT

Enclosed cargo containers for high mount automotive vehicle carriers and trailers which are designed to transport special vehicles and other cargo so as to be protected from ambient environment and road conditions. The containers may be fixed or removable mounted within the lower support deck of the vehicle trailers and may include one or a plurality of access doors for facilitating the placement of vehicles and other cargo to be transported and which, in one embodiment, may be adjustable in size so as to increase or decrease the storage space therein dependent upon hauling requirements.

28 Claims, 8 Drawing Sheets

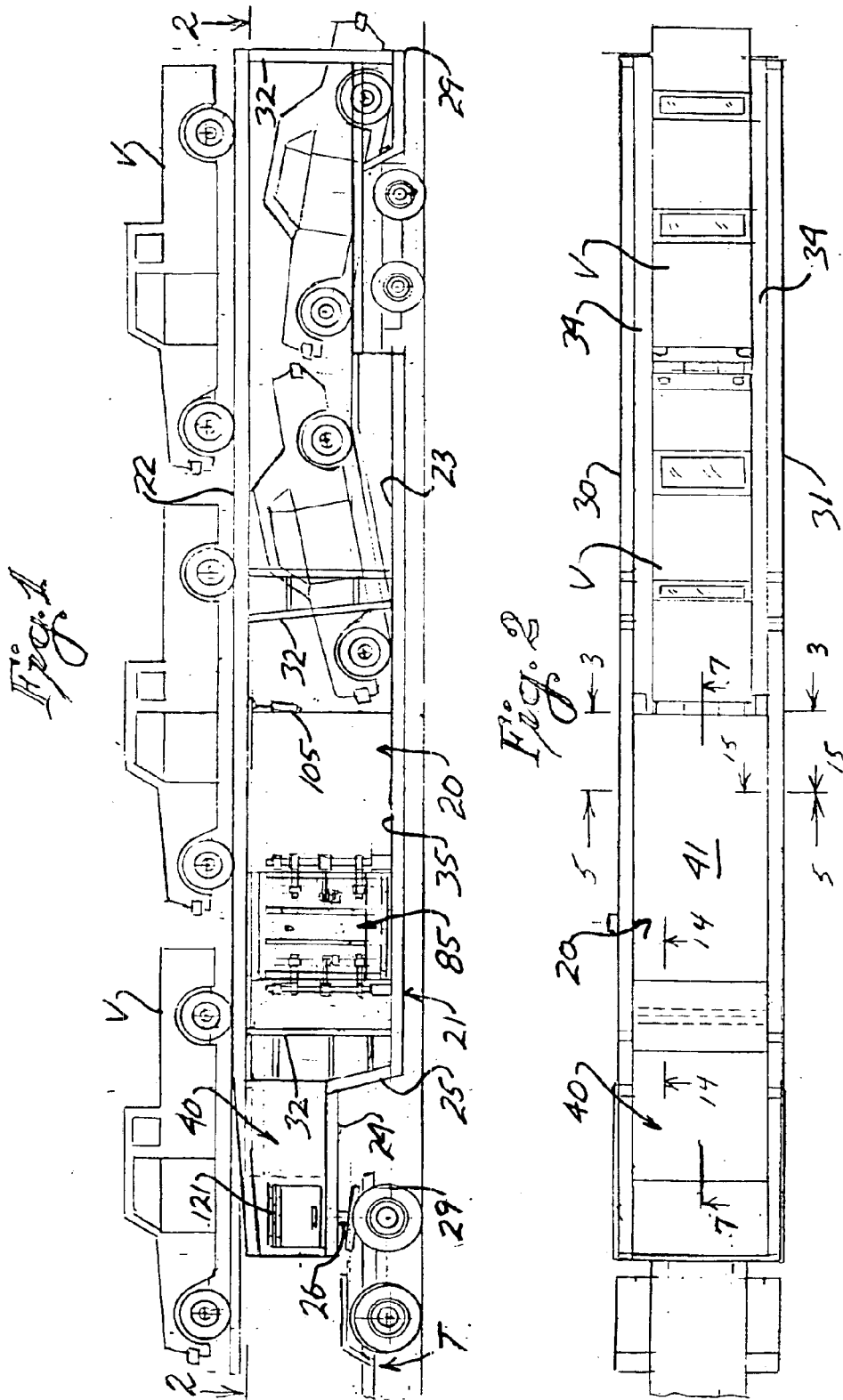

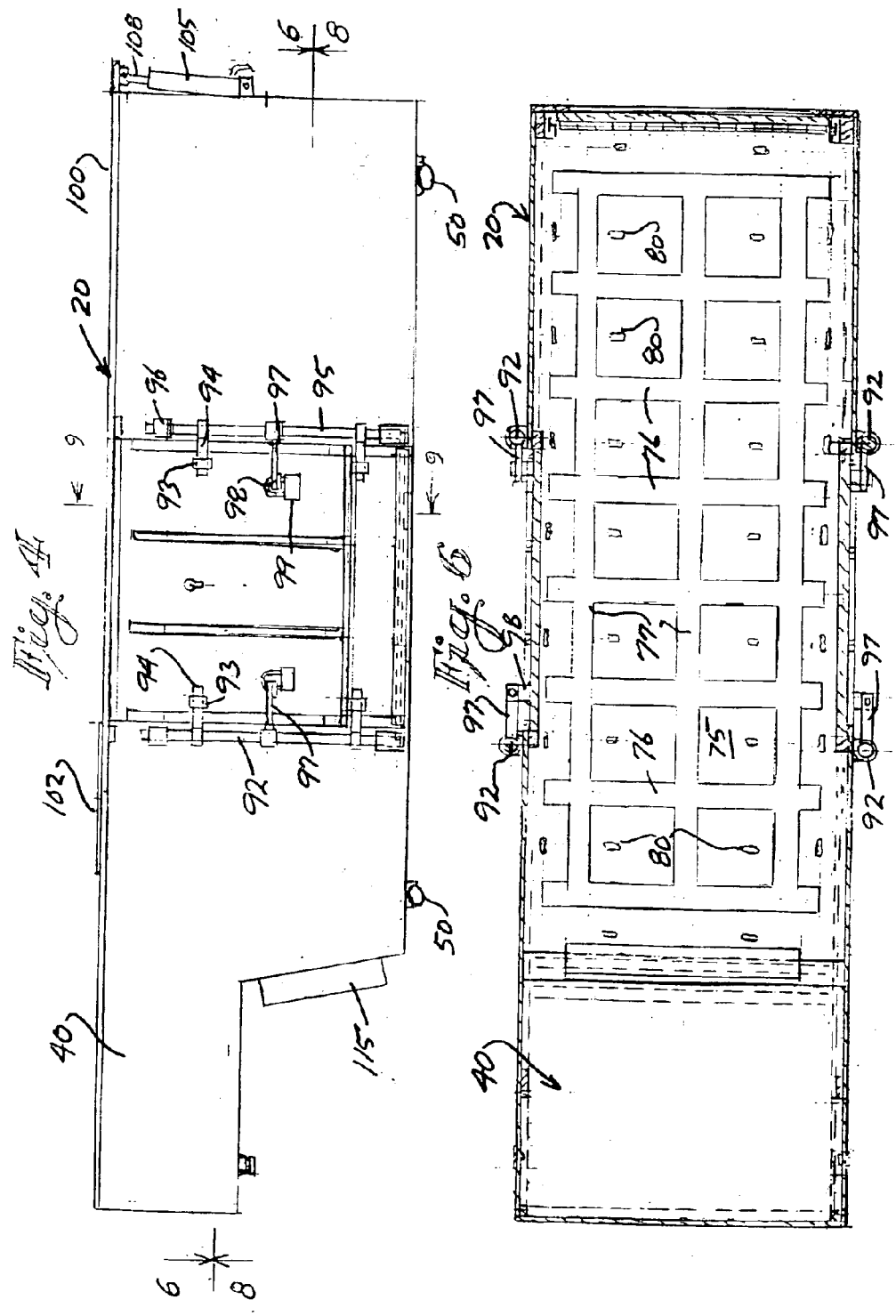

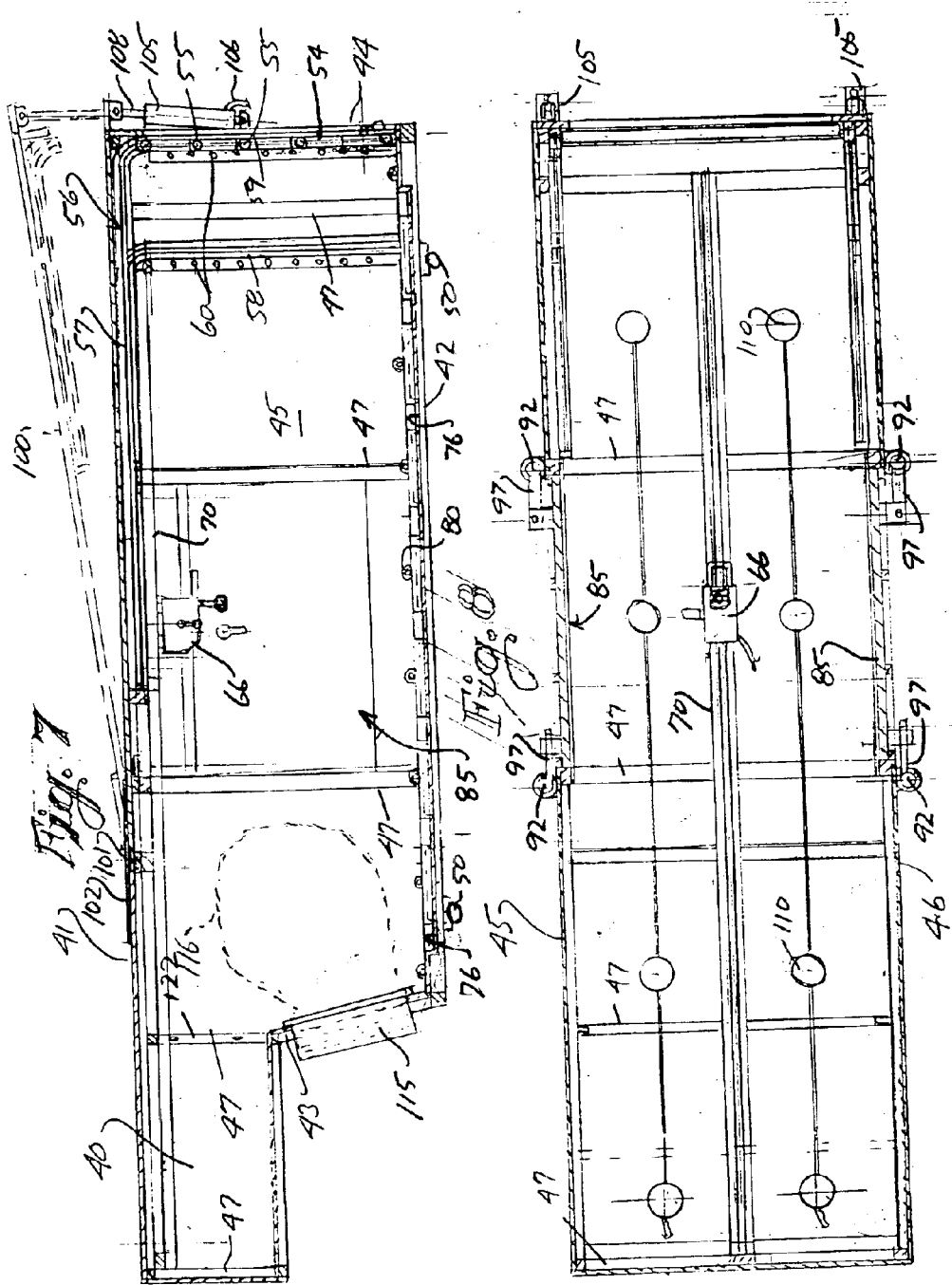

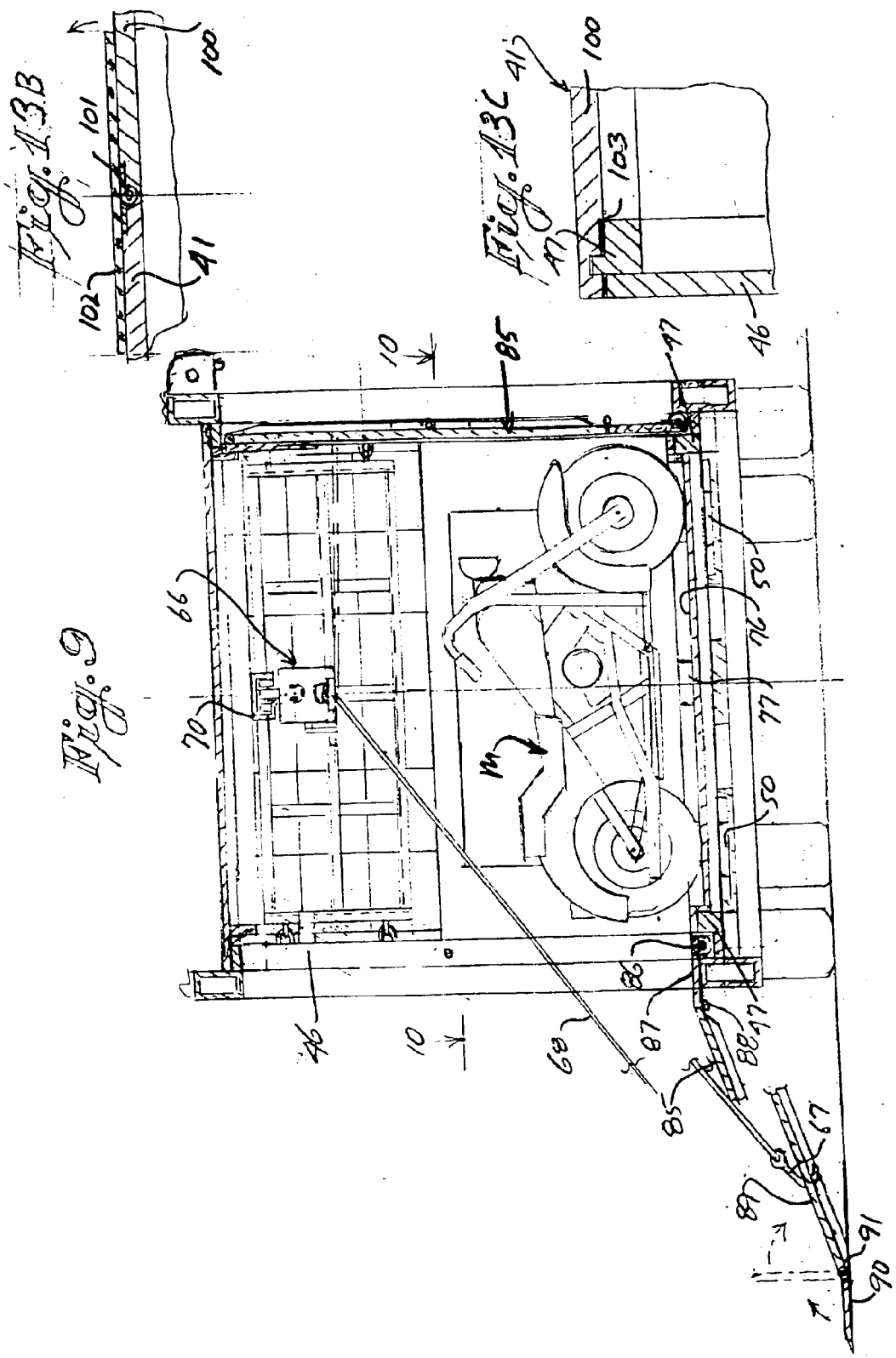

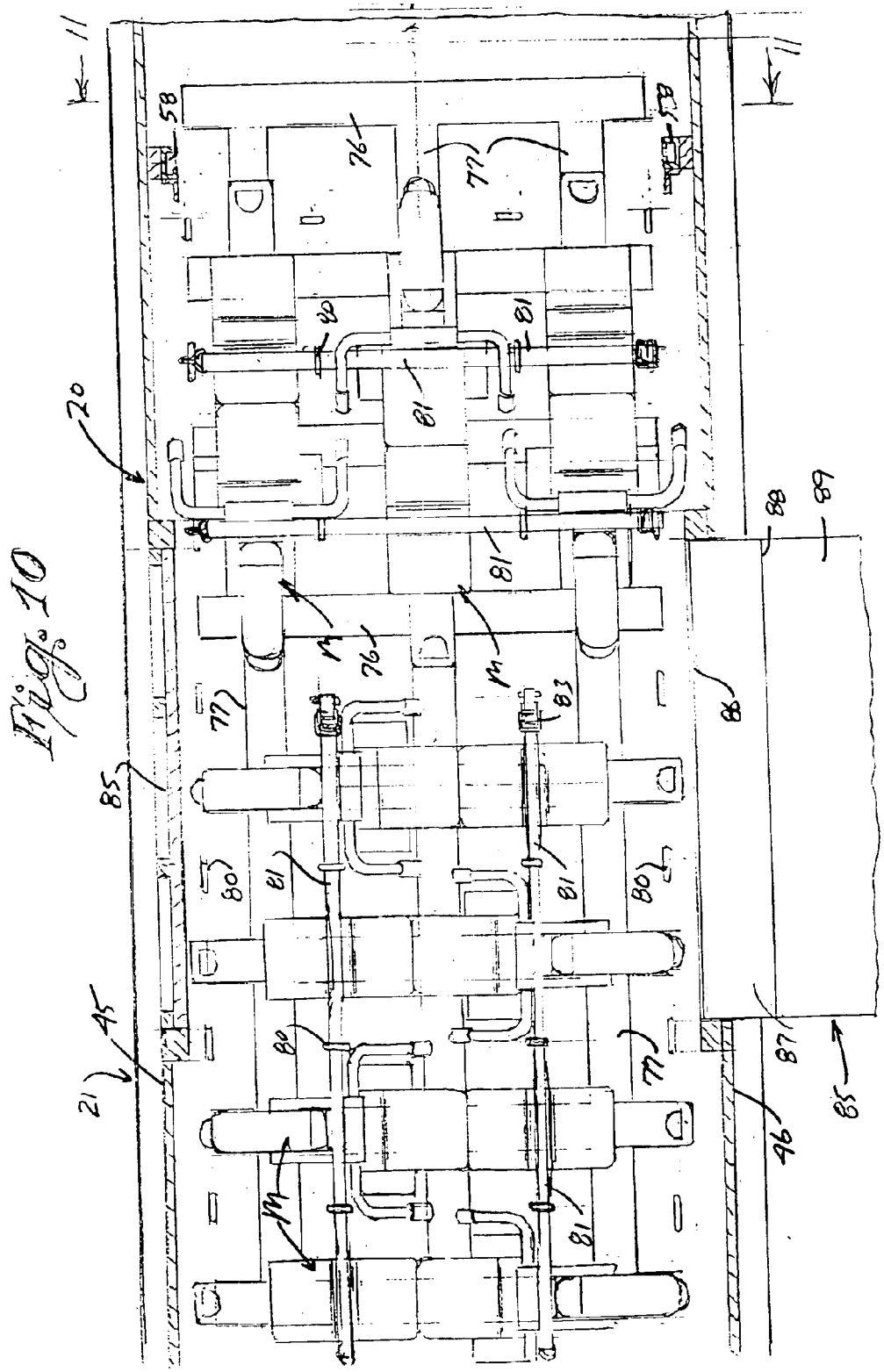

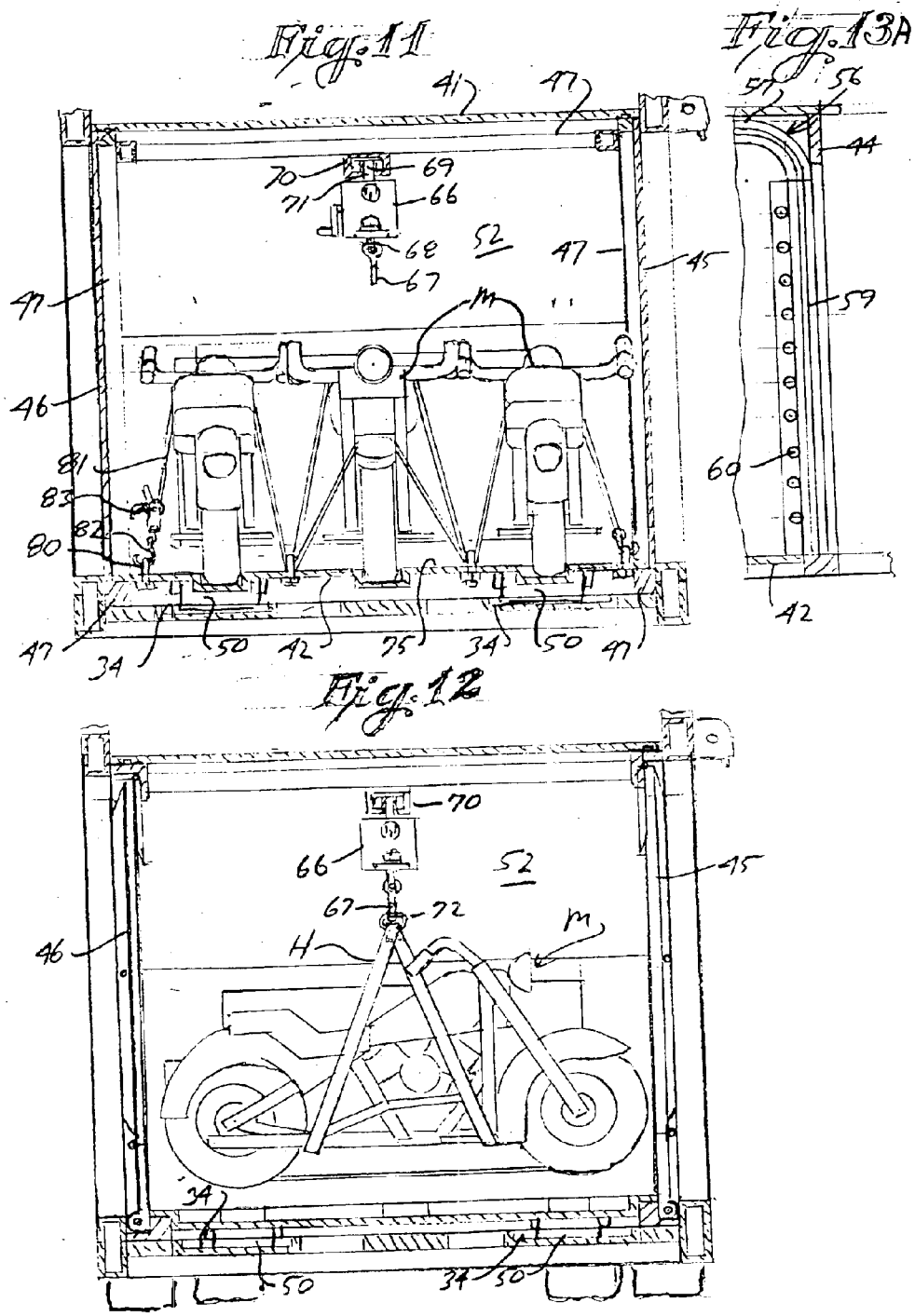

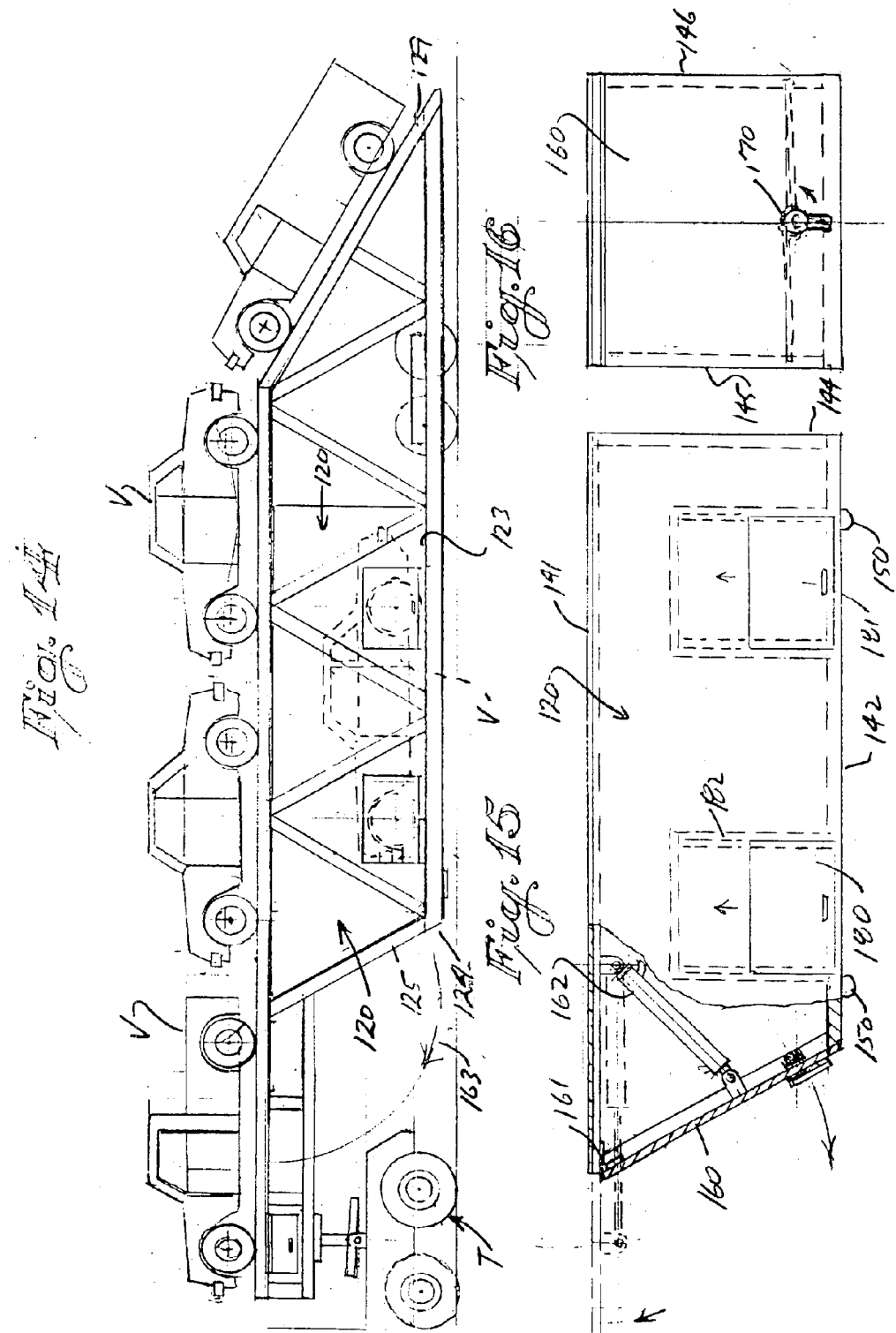

ENCLOSED CARGO CONTAINERS FOR HIGH MOUNT VEHICLE TRAILERS

BACKGROUND OF THE INVENTION

1. Field of the Invention

This invention is generally directed to vehicle trailers of the high mount type which are conventionally used to transport automotive vehicles, light trucks and the like and which normally include an upper vehicle support deck and a lower vehicle support deck which are connected by an open frame construction and wherein the trailers are designed to be pulled by a tractor. More specifically, the present invention is directed to fully enclosed containers which can be mounted within the lower vehicle support decks of the high mount trailers so as to be positioned within a conventional loading space for an automotive vehicle and wherein, in a preferred embodiment, the containers include supplemental storage compartments of a size to be positioned within open frameworks of goose neck portions of the trailers. The containers are specifically designed to transport vehicles and other cargo which are conventionally not transportable utilizing such open vehicle trailers including motorcycles, all terrain vehicles, antique, collector, classic and exotic automobiles and the like which must be protected from the ambient environment and roadway during transport.

2. Description of the Related Art

High mount automotive vehicle carriers or trailers are used throughout the world to transport a plurality of vehicles simultaneously. Conventionally, such vehicle trailers include an upper vehicle support deck and a lower vehicle support deck each of which may support one or plurality of vehicles. The trailers are generally constructed of opening steel framework and many are hydraulically adjustable so as to change the height and angle of orientation of separate support platforms on which vehicles are mounted during transport. Because of the open framework construction of such trailers, the vehicles carried thereon are subject not only to ambient weather conditions but also to hazards associated with road conditions including dirt, rocks and debris which could damage vehicle finishes.

In the new car industry, many manufacturers protect the top surface finish of vehicles by application of special plastic materials which may be removed when a vehicle has been received at a delivery location thereby reducing dealer preparation costs in refinishing or touching up damage surface areas of vehicles which are transported along open highways.

Multiple high mount vehicle carriers are normally used to carry conventional or standard sized automobiles, light trucks and the like and are not suitable for transporting other types of equipment or vehicles. Further, because of the open nature of the trailers, they are not suitable for use in transporting many other goods including other types of vehicles such as motorcycles, dirt bikes, all terrain vehicles (ATV's), motorized scooters, specialized vehicles such as racing vehicles, antique or classic vehicles, exotic automobiles and the like which must be fully protected from ambient weather and road conditions when shipped in order to preserve their value. In addition, because of the limited hauling capabilities of such open framework trailers, drivers must often schedule special shipments to insure that when driving from point to point they are not pulling a partially filled trailer which is not economical when considering a driver's time, fuel energy usage, and wear and tear on trailer equipment.

In view of the foregoing, it has been proposed, in some prior art trailers, to fully enclose the upper and lower decks such that either vehicles or generalized cargo can be shipped within fully enclosed trailers. Unfortunately, such fully enclosed trailers are expensive to manufacture and present problems with respect to efficient loading and unloading due to the small space available to vehicle operators. The advantage of such trailers is that they can be used to haul generalized cargo such as crated cargo. Examples of such double use or convertible automotive carriers are disclosed in the U.S. Pat. No. 4,738,575, to Blodgett et al., and U.S. Pat. No. 4,881,859, to Ehrlich.

Another type of trailer which is specifically designed to fully enclose vehicles when transported is disclosed in U.S. Pat. No. 4,966,510, to Johnson Jr. The patent discloses a trailer having a specialized deck system for supporting upper and lower rows of golf carts within an enclosed trailer body. The trailer body is more like a conventional tractor trailer and is not suitable for transporting conventional automotive and light truck type vehicles. Therefore, the trailer is only suitable for limited uses and cannot be used for hauling conventional automotive vehicles and light trucks.

In view of the foregoing, there remains a need to increase the utility of conventional high mount or double decker automotive carriers or trailers such that they can be used for carrying a plurality of automotive or light truck vehicles or can be used for hauling not only conventional automobiles and light trucks but simultaneously for hauling specialized vehicles including motorcycles, classic, collector and antique automotive vehicles and the like as well as other goods wherein such specialized vehicles and goods are shipped in a fully enclosed container carried by the automotive trailer.

SUMMARY OF THE INVENTION

The present invention is directed to an enclosed cargo container which is adapted to be mounted within a section of a lower support deck or platform of a high mount automotive open frame trailer of the type which is used to haul a plurality of vehicles such as conventional automobiles and light trucks. Although the enclosed cargo container may be fixedly secured to a section of the lower supporting deck of a trailer, in preferred embodiments, the container is removably mounted with respect to the trailer and, in this respect, may include rollers or wheels for facilitating the placement of the container within the desired section of the lower deck. In instances where the trailer includes an open framework goose neck portion which extends towards a hauling tractor, the cargo container may include an auxiliary storage box or enclosure of a size to be cooperatively received within the open goose neck framework when the container is placed on the lower supporting deck of the automotive trailer.

In accordance with the invention, the enclosed container includes at least one enlarged access door for permitting loading and unloading of cargo, including, but not limited to smaller vehicles such as motorcycles; dirt bikes, all terrain vehicles (ATVs) and scooters or, alternatively, to permit the hauling of standard or conventional sized vehicles which must be shipped in a fully protected enclosure such as antique or classic vehicles, collector vehicles, exotic and racing vehicles and the like. Shipment of spare parts and related equipment is facilitated by the use of the auxiliary cargo box or enclosure and, in some embodiments, a separate access door may be provided in a side wall of such box to facilitate the placement of equipment and goods.

In one preferred embodiment of the invention, the enclosed container includes a moveable access door in a rear wall thereof which can be selectively closed in at least two positions so as to vary the volume of space defined by the interior of the container. In such embodiment, at least two horizontally spaced vertical tracks are provided in cooperation with a horizontal track in which the rear door is movably mounted such that, by manipulation of the door into a selected vertical track, the effective space within the container is changed in order to facilitate either more space within the enclosed container or to provide for additional space exteriorly of the container to permit additional vehicles to be mounted in a conventional manner to the lower deck of the vehicle trailer.

In some embodiments, a door which functions as a loading and off loading ramp may also be provided in one or both sidewalls of the enclosed container for facilitating lateral loading of vehicles and other equipment. Such doors are preferably pivotally mounted adjacent to the floor of the container and may include a plurality of separately hinged sections which allow the doors to be cantilevered outwardly relative to the frame of the trailer and then angled downwardly to ground level to facilitate the loading and off loading of the vehicles and other equipment. The raising and lowering of the side doors may be controlled by hydraulic devices which may be connected to the hydraulic system of a conventional tractor. In other embodiments, a winch which is preferably moveably or adjustably mounted within the container may be utilized to raise and lower the side ramp/doors. Such winch may also be utilized to facilitate the loading and off loading of vehicles and other equipment into the container.

To facilitate the transport of smaller wheeled vehicles such as motorcycles and the like, in one embodiment, the floor of the container may include a plurality of generally U-shaped channels which are of a size to cooperatively receive the wheels of the vehicle. The channels may run parallel to one another either longitudinally or widthwise of the container, or in some embodiments, may run in both directions so as to facilitate loading either forwardly, rearwardly, or from the sides of the container.

The container also provides for a plurality of tie down elements to be secured relative to the floor or side walls of the container such that, once a vehicle or other cargo is positioned within the container, nylon webbing or other type straps may be secured to appropriate supports such as D-rings which straps may be secured to the vehicle or other cargo to prevent any shifting during shipment.

The containers of the present invention may also be provided with adjustable roofing sections such that a portion of a roof may be raised to facilitate the maneuvering of vehicles and other goods into and out of the container and to also allow the container to be adapted to be used with trailers wherein the upper decking of the vehicle trailer is vertically adjustable to facilitate loading and off loading of vehicles on the upper supporting deck or platform. In such embodiments, hydraulic cylinders may be mounted to the container which are engageable with a pivotable roof section such that the roof section can be raised when required. Appropriate seals can be provided on the pivotal roof section in order to seal the roof section when lowered with respect to the sides and end walls of a container.

In yet a further embodiment of the invention, the enclosed containers are specifically designed to be retrofitted on, or be loaded into, a five vehicle type trailer commonly referenced in the industry as a "Wally-Mo". Such conventional automotive trailers require that the tractor be unhitched to allow access to units which are mounted inside the lower deck of the double deck trailer. In such embodiments, the containers are designed to be fitted within the lower deck and include an access door which is pivotal to the front or toward a tractor when the tractor is hitched to the trailers. Preferably, the door is pivotal forwardly to form a loading ramp to facilitate the placement of vehicles and other goods or equipment within the containers for shipment. With such embodiment, it is also necessary to provide moveable side panels or doors on opposite sides of the container to facilitate the locking down or anchoring of vehicles and other goods mounted within the containers.

In some embodiments of the present invention, each container is also provided with at least one or plurality of pneumatically operated air bags which are sensor deployed upon impact so as to provide cushions to protect any vehicles or other goods which are stored within the containers. Further, due to the nature of the containers of the present invention, lighting systems are provided interiorly thereof to facilitate operators with such lighting systems being connectable to the electrical power supply of a motive tractor.

It is the primary object of the present invention to increase the utility and economics associated with conventional high mount automotive vehicle carriers or trailers such that such trailers can be used to concurrently ship both conventional vehicles which may be shipped in an open environment as well as other vehicles, equipment or goods which must be shipped in a fully enclosed and protected environment.

It is a further object of the invention to provide a safe storage container for shipping goods which cannot be exposed to ambient and road conditions during shipment so that such goods can be shipped by conventional vehicle carriers without significantly increasing the cost of the trailers and without significantly increasing the gross weight of the trailers.

It is also an object of the invention to provide enclosed shipping containers for use with conventional high mount vehicle carriers wherein access to the storage containers may be obtained through a plurality of doors such that equipment or vehicles can be loaded either laterally or longitudally with respect to the containers and wherein some doors may function as ramps as well as closures.

It is yet another object of the invention to provide for a safe shipping container for use with conventional vehicle hauling trailers having upper and lower automotive supporting decks wherein the shipping container may be provided with air bags which are inflatable upon impact of the trailer so as to protect vehicles and other goods being shipped within the container.

It is yet a further object of the present invention to provide a container for use with high mount automotive trailers wherein the container may be adjustable to alter the volume thereof to facilitate either the shipping of vehicles and goods within the container or to permit the placement of additional vehicles exteriorly of the container when the container is mounted to a deck of a conventional vehicle trailer.

BRIEF DESCRIPTION OF THE DRAWINGS

A better understanding of the invention will be had with reference to the accompanying drawings wherein:

FIG. 1 is a side elevational view of a conventional high mount vehicle trailer having upper and lower vehicle supporting decks or platforms and showing a container in accordance with the invention mounted to a forward section of the lower supporting deck;

FIG. 2 is a cross sectional view taken along line 2—2 of FIG. 1;

FIG. 4 is a side elevational view of the container shown in FIG. 1;

FIG. 6 is a cross-sectional taken along line 6—6 of FIG. 4;

FIG. 7 is a cross-sectional view taken along line 7—7 of FIG. 3 showing the raising of a roof or top wall section of the container in dotted line;

FIG. 8 is a cross sectional view taken along line 8—8 of FIG. 4;

FIG. 9 is a cross-sectional view taken along line 9—9 of FIG. 4 showing a motorcycle positioned within the container;

FIG. 10 is a cross-sectional view taken along line 10—10 of FIG. 9 showing a plurality of motorcycles being secured within the container shown in FIG. 4 and as mounted to the conventional trailer as shown in FIG. 1;

FIG. 11 is a cross-sectional view taken along line 11—11 of FIG. 10;

FIG. 12 is a view similar to FIG. 11 showing an interior hoist mechanism for moving vehicles or equipment into and out of the storage container of FIG. 4;

FIG. 13A is a partial sectional view taken along line 13—13 of FIG. 5;

FIG. 13B is an enlarged view of the upper wall pivot assembly and seal of FIG. 7;

FIG. 13C is an enlarged view taken along line 13C—13C of FIG. 7 showing the seal between the side wall and pivotal upper wall section;

FIG. 14 is a side perspective view of another embodiment of the invention showing a five vehicle trailer having a modified enclosed container mounted to the lower platform thereof;

FIG. 15 is a side view of the enclosed container of FIG. 14; and

FIG. 16 is a front view of the access door shown in FIG. 15.

DESCRIPTION OF THE PREFERRED EMBODIMENTS

Figure 3:
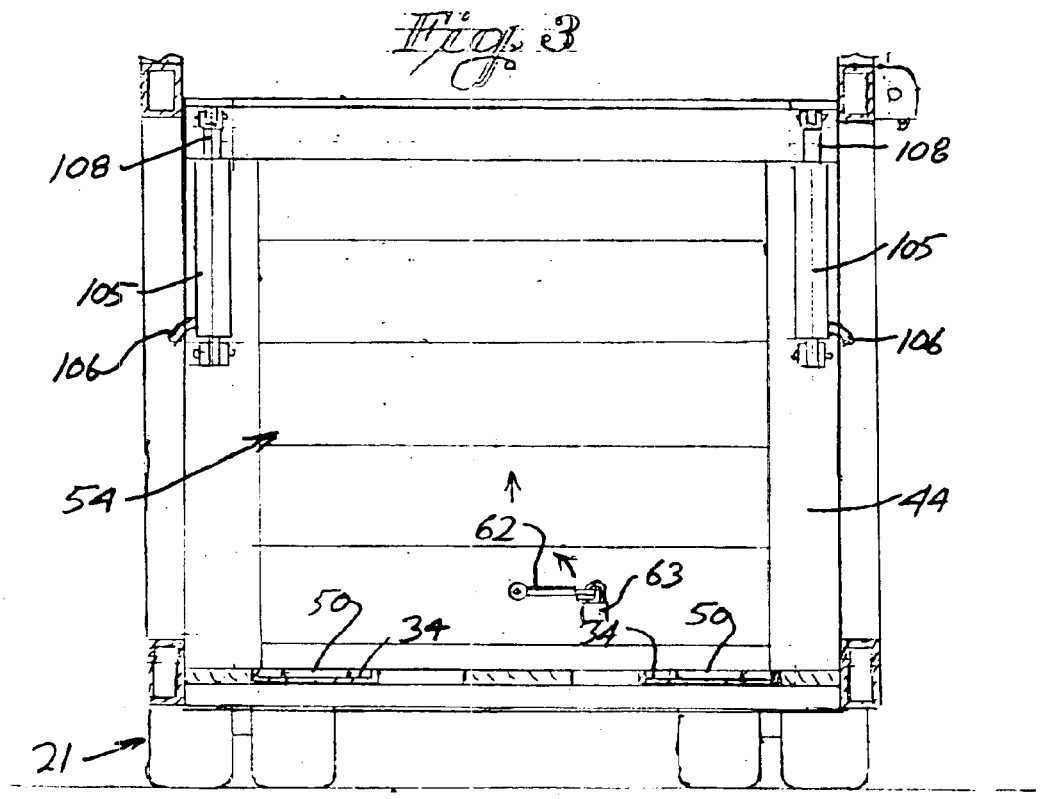
FIG. 3 is a view taken along line 3—3 of FIG. 2.

The present invention is directed to enclosed cargo containers 20, see FIGS. 1 and 4, which are specifically configured so as to be cooperatively mounted or seated within a section of a vehicle transport trailer 21 of a high mount type. The transport trailers are particularly designed to carry a plurality of automotive vehicles "V" including automobiles and light trucks. Such vehicle carriers or trailers are open frame steel structures which include an upper supporting deck or platform 22 and a lower supporting deck or platform 23. The upper vehicle supporting deck 22 is often vertically adjustable by means of hydraulic cylinders (not shown) such that the space between the upper and lower platforms can be varied so as to facilitate the loading and unloading of vehicles. In the embodiment shown in FIG. 1 the trailer 21 further includes a goose neck open frame structure 24 which extends forwardly of the front portion 25 of the trailer so as to be mounted at 26 to a hitch assembly 27 of a tractor "T" which may be a conventional diesel truck.

The trailer also includes, for purposes of reference, a rear portion 29 and opposite side frame components 30 and 31 which are interconnected by a plurality of spaced vertical posts 32, which again, may be vertically adjustable. The vehicles are loaded onto the upper and lower platforms by driving the vehicles onto spaced generally parallel tracks 34, such as illustrated in FIG. 2, which are generally U-shaped in configuration and of a size to support or cradle the vehicle tires therein.

The size and overall configuration of the automotive transport trailer 21 may vary, however, the present invention is uniquely adapted for use with double or high mount open frame trailers so as to increase the utility of such trailers for hauling other types of vehicles and cargo which must be fully enclosed during shipment. Conventionally, a high mount trailer as illustrated in FIG. 1 can haul seven or more vehicles depending upon the size of the vehicle, i.e. compacts, full size cars or light trucks.

The enclosed cargo container 20 of the invention is preferably mounted within a forward section 35 of the lower deck 23 of the trailer 21 so as to be positioned adjacent the forward portion 25 of the trailer. In some embodiments, it is possible that the container is rigidly or permanently secured to the frame components of the trailer, however, in preferred embodiments, the container 20 is designed to be removably mounted within the trailer such that the container may be selectively used when conditions warrant, such as when a hauler does not have a complete complement of automotive vehicles to transport from one site to another, or when it is beneficial to transport a plurality of smaller vehicles, such as motorcycles and the like, at the same time that a plurality of more conventional vehicles are to be transported.

With particular reference to FIGS. 3–13C a preferred embodiment of the present invention is disclosed in detail and is shown as it would be used to haul various types of vehicles or other cargo which are not conventionally hauled utilizing an open frame vehicle carrier. The cargo container 20 is shown as being an enclosed box of a size and configuration to be cooperatively received within the front section 35 of a vehicle carrier or trailer 21. In the preferred embodiment shown, the box also includes a forward protruding auxiliary enclosure 40 of a size to be received within the open goose neck frame portion 24 of the trailer. The container includes a top wall 41, bottom wall 42, front end 43, rear end 44, and opposite side walls 45 and 46. The walls are preferably made of metal such as sheet steel but, in some instances, may be formed of wood, plastics or other materials. The walls are mounted to a steel framework generally identified at 47 which includes not only vertical and horizontal components but also transverse components for extending across the width of the container. Although the container may be rigidly secured such as by welding or otherwise to the framework of the vehicle carrier 21, in some embodiments, the enclosure is designed to be removably loaded onto the vehicle carrier. In this regard, sets or pairs of heavy duty rollers 50 (see FIG. 5), are either mounted to axles mounted from the bottom wall of the container or which extend to the side frame components thereof. The rollers are of a size to be cooperatively received within the tracks 34 provided along the decks of the vehicle carrier for purposes of receiving vehicle wheels as previously described. After an enclosure is positioned within the front section 35 of the trailer with the protruding portion 40 thereof seated within the open goose neck frame 24, appropriate hold down devices, clamps, webbing, belting, straps or the like can be used to secure the enclosure in position relative to the framework of the trailer.

To obtain entry into the open space 52 defined by the walls of the enclosure, a first multi-panel roll-up door 54 is mounted by appropriate roller assemblies 55 to guide tracks provided within the enclosure and extending along both sides thereof. With specific reference to FIG. 7, in a preferred embodiment of the invention, the guide tracks 56, only one being shown in FIG. 7 associated with side wall 45, include a horizontal run 57 which communicates with a pair of vertical runs 58 and 59. Vertical run 59 is mounted adjacently the rear 44 of the enclosure such that when the door 54 is guided along the vertical guide tracks 59, substantially the entire space 52 within the enclosure is enclosed and sealed from ambient and road conditions. In some instances, it may be necessary to alter the effective volume or space defined within the enclosure. In this respect, the rear panel door 54 may be selectively guided within the opposing tracks 58 which are mounted adjacent the side walls 45, 46 spaced inwardly relative to the rear 44 of the container. In these instances, the volume or space within the container is reduced thereby allowing a greater area or space to be available exteriorly thereof for purposes of allowing conventional vehicles "V" to be mounted adjacent to the container. This may be especially true where a vehicle is of a larger size such as a luxury sedan and there is not sufficient room for otherwise securing the conventional vehicle to the deck of the trailer adjacent to the container unless the container's dimensions are reduced.

Figure 5:
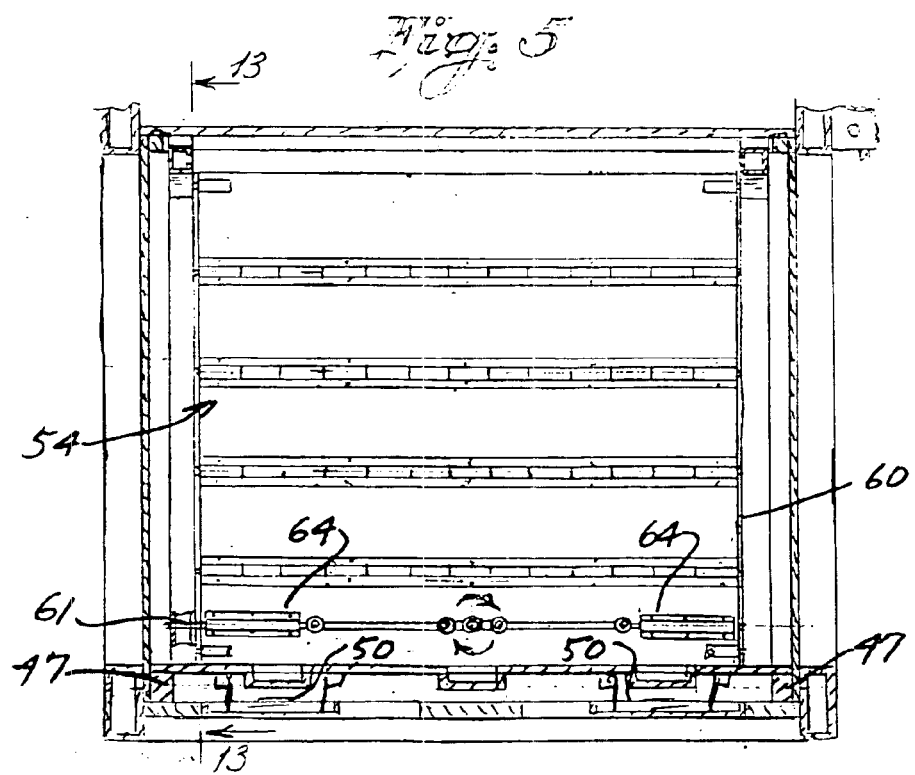
FIG. 5 is a cross sectional view taken along line 5—5 of FIG. 2.

The opposing tracks 58 and 59 also include a plurality of vertically spaced openings 60 for purposes of receiving locking pins 61 therein, as shown in FIG. 5, upon operation of a pivotal handle 62 mounted rearwardly of the panel door 54 so as to be accessible to the rear 44 of the container. When the rear panel door 54 is closed, an appropriate lock 63 may be used to secure the handle in position and prevent unauthorized opening of the door into the container. The locking pins 61 are guided within sleeves 64 mounted to the inner surface of the door as shown in FIG. 5. Because of the vertical spacing of the holes or openings 60, the door may also be secured at a plurality of vertical heights relative to the vertical tracks 58 and 59 in which the roller assemblies of the door assembly are guided. The tracks are generally C-shaped in cross-section and are structured similar to conventional guide tracks utilized for panel trucks, garage doors and the like.

To aid in the loading of vehicles and other cargo within the container, the container may include an electric or hydraulic winch 66 which may be of a substantially conventional type having a hook 67 mounted by a cable 68 to a winding assembly mounted within the winch. The winch is suspended from a roller dolly 69 which is movable in an elongated generally C-shaped track 70 which is mounted interiorly of the container. As shown in the drawing figures, the track 70 may be secured such as by welding to the frame components 47 which extend across the framework of the container such that the track extends longitudinally generally parallel to a longitudinal center line of the container. Other orientations are possible. The dolly 69 includes a spindle 71 which allows the winch to be rotated as required for purposes as will be discussed in greater detail.

When loading vehicles or other cargo into the container the hook 67 of the winch may be secured to harnesses "H" designed to support a vehicle, such as a motorcycle "M", wherein the harness includes a D-ring 72 which is engageable by the hook 67. The winch can be utilized to elevate and position the vehicle in substantially any location within the space 52 defined by the container.

The container 20 of the invention is particularly adapted to allow the safe and efficient hauling of specialty type vehicles which must be fully protected in an enclosed environment when being shipped. These include such vehicles as motorcycles, all terrain vehicles, some types of motorized scooters and bikes as well as other vehicles including antique or classic type cars, collector vehicles, racing vehicles and other exotic automobiles.

For purposes of allowing transport of wheeled vehicles, an inner floor 75 of the container may include a plurality of generally U-shaped guide channels 76 and 77 which are in open communication with one another as shown in FIG. 6. The U-shaped channels 76 extend across the width of the floor 75 whereas the channels 77 extend longitudinally of the floor. The channels are of a size cooperatively received the tires of the vehicle as is shown in FIG. 11. To secure the vehicles such as motorcycles "M" in position within the container, hold down elements are provided to secure the vehicles within the tracks 76 and 77. As shown in FIG. 11, such tie down elements may include, for example, a plurality of ring members 80 which may be bolted, welded or otherwise secured to the bottom wall 42 of the container intermediate each of the channels. Special tie down straps 81 having hooked ends 82 may be used with a ratchet tightener 83 which is of a conventional design. The straps can be laced from ring to ring as shown in the drawing figures extending over and through parts of the vehicles being secured to thereby stabilize the vehicles within the tracks. By operation of the ratchet assembly 83, the tie down straps may be tightened to prevent movement of the vehicles. Other types of tie down assemblies may be used in accordance with the teachings of the invention.

In some embodiments of the invention, side doors 85 may be provided in one or both of the side walls 45 and 46 of the enclosure to permit access into the container through the side walls as opposed to, or in addition to, the rear end wall. The doors may be roll up multipanel doors such as the one 54 previously described which would run in tracks. However, in order to facilitate the ease of loading and unloading of vehicle and other cargo into the containers 20, in the preferred embodiments, the side doors 85 are pivotally mounted such as shown in 86 relative to the lower frame members 47 of the container such that the doors may be pivoted to form ramps to allow vehicles to be moved along the ramps during ingress and egress relative to the container.

In some embodiments, a single door 85 are provided on one or the other of the opposite sides of the container and in others, as is shown in the drawing figures, doors 85 may be provided on both side walls of the container. Each door assembly is the same and, therefore, only the door assembly shown pivotally mounted to the side wall 46 of the container will be described in detail.

To enable the doors 85 to serve as ramps, the doors must provide a first horizontal platform section 87 which extends outwardly of the frame of the vehicle carrier or trailer 21, as shown in FIG. 9. Thereafter, a secondary pivot 88 is provided allowing the primary section 89 of the door to achieve an inclined orientation toward a surface. In some embodiments, a further outrigger section 90 may be pivotally mounted at 91 to the lower or outer end portion of the primary section 89 of the door 85.

Although the doors 85 may be raised and lowered by hydraulic cylinders or similar devices, as the containers are provided with the winch assembly 66, openings may be provided in a frame component of the doors in which the hook 67 associated with the winch 66 may be engaged in order to use the winch to raise and lower the door, as is shown in FIG. 9. When the doors 85 are in a raised or closed position as is shown in FIGS. 1, 4, and 6, the doors may be locked by pivotal lock bar assemblies 92 which are mounted on the exterior of the container on opposite sides of the doors. Each door is provided with a plurality of generally L-shaped brackets 93 in which lock bars 94 may be received. The lock bars are rotatable about support rods 95 mounted within bearing brackets 96 secured to the side walls of the container. The bars 95 may be elevated by handles 97 and pivoted so as to allow the lock bars 94 to be dropped into the L-shaped brackets 93. The handles may be secured to lock plates 98 by the use of conventional locks, such as padlocks 99, which extend through openings in the handles 97 and in the lock plates 98.

Because of the multi-sectional characteristics of each of the side doors 85, the doors may utilized to load vehicles or other cargo regardless of the relative vertical positioning of the container 20 relative to a loading surface.

As previously discussed, in some vehicle carriers, the upper deck 22 may be vertically adjustable relative to the lower deck 23. In these instances, the decking may be raised or lowered to facilitate the loading and unloading of vehicles "v". In order to adapt the container of the present invention to benefit from any extension or adjustment of the upper deck height relative to the lower deck height of the trailer, the present invention permits a section 100 of the upper wall 41 to be raised and lowered as is shown in dotted line in FIG. 7. The raising of the section provides additional headroom within the container which is obtained when the upper deck 22 of the trailer is raised relative to the lower deck 23. Whenever the upper deck is lowered, the roof section 100 can be lowered by operation of hydraulic cylinders 105.

As shown, a pair of hydraulic cylinders 105 are mounted at the rear of the container and are openably connecting through hydraulic lines 106 to a hydraulic sytem of the tractor-trailer. The cylinders are connected to the pivotal system 100 by piston rods 108.

The top wall section is pivoted at 101 to the fixed portion of the top wall 41. To prevent leakage at the pivot joint 101, such joint is covered with a flexible seal 102, see FIG. 13B. When the pivotal wall section is closed, the joint between the section and side and rear walls is sealed by a seal 103 as shown in FIG. 13C.

As the container 20 is designed to be fully enclosed to prevent any ambient weather or any debris from entering when the doors associated therewith are sealed, the present invention also provides lighting within the container. With respect to FIG. 8, a plurality of spaced lights 110 are electrically connected to one another and may be connected to an electrical supply associated with the tractor "T".

The invention further provides one or a plurality of enlarged soft or yieldable air bags which may be inflated and deployed upon impact of the trailer which is predetermined to be irregular. In this respect, in drawing FIG. 7, an air bag inflation assembly 115 is shown as being mounted in a portion of the front wall 43 of the container. Mounted within the air bag assembly is an air bag 116 which, when deployed and inflated, will enter into the space within the container in order to cushion the cargo therein. The air bag 116 is generally shown in dotted line when inflated in FIG. 7. Air bags may be provided in addition along the upper, side and, in some instances, lower walls of the container.

To provide easy access into the protruding auxiliary front storage portion 40 of the container 20, as shown in FIG. 1, one or more door or panel members 120 may be provided which are pivotally mounted such as at 121 to the side wall of the container. Appropriate locking mechanisms may also be provided. Further access into the auxiliary enclosures 40 may be obtained through openings 122 within the interior of the container, as is shown in FIG. 7. Personal belongings as well as different types of cargo, spare parts and the like which may be associated with vehicles being hauled within the container may be stored within the compartment 40.

With specific reference to FIGS. 14-16, a further embodiment of the invention is disclosed which is specifically for use with open framework trailers 124 for hauling vehicles "V" wherein the lower deck 123 must be unloaded and loaded through the front 125 of the trailer due to a fixed framework which extends along the rear 129 of the trailer. Generally such vehicle trailers cannot be used for transporting as many vehicles as the trailers previously described. Further, such trailers must be unhitched from the towing vehicle or tractor "T" in order to permit loading and unloading through the forward end of the lower deck.

As with the embodiments previously described, the container 120 is designed to be fully enclosed so as to protect the internal cargo which may be any cargo as discussed within the application as well as other cargo. The container is of a size to be cooperatively received along the lower deck 123 of the trailer 124 and may either be rigidly and fixedly secured within the framework of the trailer, such as by welding, or may be removably mounted so that the container 120 may be used when necessary or otherwise removed to allow the shipment of a conventional vehicle on the lower deck 123. The container may include support rollers 150 to permit ease of loading and unloading. The container also includes a top wall 141, bottom wall 142 a rear wall 144 and opposite side walls 145 and 146 which define a cargo storage space therein. Container 120 may include the same type of tracks as described for enabling the cooperative supporting of vehicles such as motorcycles "M" and may also include appropriate winch assemblies such as previously described to facilitate loading.

In the present embodiment, the front of the container 120 is sealed by a door assembly 160 which is pivotally mounted at 161 either to the upper wall 141 as shown in drawing FIGS. 15 and 16 or to the lower wall 142. Hydraulic cylinders 162 are mounted within the container 120 and are connected such as to extend the door 160 to a generally horizontal position to open and provide access to the container as is illustrated by the arrow 163 in FIG. 14. Appropriate seals may be provided with a door to ensure that the space within the container 120 is sealed from all ambient conditions when the door is closed. A locking assembly similar to that described with respect to the locking of the door 54 shown in FIGS. 3 and 5 and as shown in drawing FIG. 16 at 170, may be provided for locking the door in a closed position. As opposed to pivotally mounting the door at 161 to the upper wall 141 of the container, the door may also be mounted to the lower wall adjacent to the front end such that when the door is lowered, the door may function as a ramp to facilitate the loading of vehicles and other types of cargo.

To facilitate the adjustment of hold down mechanisms with the embodiment of FIGS. 14–16, at least one and preferably two doors or sliding panels 180 and 181 are provided in spaced relationship on at least one and preferably both of the opposite side walls 154 and 156. The panels may slide in tracks 182 so as to be raised to permit access to the tie down mechanisms associated with any cargo, such as shown in dotted line in FIG. 14 where the panels provide access in an area of the vehicle's wheels. The tie down mechanism or assemblies may be similar to those disclosed with respect to the previous embodiment.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. An enclosed transport container for use with a vehicle transport trailer having an upper deck for selectively supporting a plurality of automotive vehicles and a lower vehicle supporting deck and wherein the trailer includes hitch means for connecting to a motorized tractor, the enclosed transport container being configured to be positioned along the lower vehicle supporting deck, and including front, rear and opposite side walls and upper and lower walls defining a generally fully enclosed space in which at least one vehicle may be stored and protected from ambient conditions when in use, said container including at least one access door of a size to permit the at least one vehicle to ingress and egress the enclosed space, vehicle tie-down means provided within the enclosed space for securing the at least one vehicle within the enclosed space, and said container includes roller elements for permitting said container to be rolled into a position on the lower vehicle supporting deck of the trailer.

2. The transport container of claim 1 including at least one inflatable air bag mounted within said container and deployable so as to provide a protective cushion for the at least one vehicle secured within the enclosed space.

3. The transport container of claim 1 wherein said at least one access door being provided in a front portion of said container so as to be oriented toward a front portion of the trailer, and a closure mechanism including means for opening said access door toward the front portion of the trailer.

4. The transport container of claim 3 including at least one access panel in each of said side walls to permit access to said tie-down means.

5. The transport container of claim 3 in which said door is pivotally mounted to said container and functions as a loading ramp in a lowered position and as a barrier in a raised position.

6. An enclosed transport container for use with a vehicle transport trailer having an upper deck for selectively supporting a plurality of automotive vehicles and a lower vehicle supporting deck and wherein the trailer includes hitch means for connecting to a motorized tractor, the enclosed transport container being configured to be positioned along the lower vehicle supporting deck, and including front, rear and opposite side walls and upper and lower walls defining a generally fully enclosed space in which at least one vehicle may be stored and protected from ambient conditions when in use, said container including at least one access door of a size to permit the at least one vehicle to ingress and egress the enclosed space, said at least one access door being in said rear wall, track means mounted within an upper portion of said container, said at least one access door including rollers guidingly mounted within said track means so that at least one access door may be moved from a lowered closed position to a raised open position, and latch means for securing said at least one access door in said lowered closed position.

7. The transport container of claim 6 wherein said track means includes a first substantially vertical run adjacent to said rear wall of said container and a second substantially vertical run spaced inwardly as said container spaced from said rear wall thereof such that when said at least one access door is positioned within said first substantially vertical run in the lowered closed position, said enclosed space within said container defines a first volume and when said at least one access door is in said second substantially vertical run in the lowered closed position, said enclosed spaced within said container defines a second volume which is less than said first volume.

8. The transport container of claim 6 wherein said at least one access door is moveable to vary an effective vehicle load space along said lower supporting deck exteriorly of the said container while concurrently changing a volume defined by said enclosed space.

9. The transport container of claim 3 including at least one inflatable air bag mounted within said container and deployable so as to provide a protective cushion for the at least one vehicle secured within the enclosed space.

10. The transport container of claim 8 including at least one inflatable air bag mounted within said container and deployable so as to provide a protective cushion for the at least one vehicle secured within the enclosed space.

11. The vehicle transport container of claim 6 wherein said container includes roller elements for permitting said container to be rolled into a position on the lower vehicle supporting deck of the trailer.

12. An enclosed transport container for use with a vehicle transport trailer having an upper deck for selectively supporting a plurality of automotive vehicles and a lower vehicle supporting deck and wherein the trailer includes hitch means for connecting to a motorized tractor, the enclosed transport container being configured to be positioned along the lower vehicle supporting deck, and including front, rear and opposite side walls and upper and lower walls defining a generally fully enclosed space in which at least one vehicle may be stored and protected from ambient conditions when in use, said container including at least one access door of a size to permit the at least one vehicle to ingress and egress the enclosed space, at least a portion of said upper wall being elevatable relative to said opposite side walls and rear wall of said container and jack means for selectively raising and lowering said at least a portion of said upper wall.

13. The transport container of claim 1 including winch means and means for adjustably mounting said winch means within said container.

14. The transport container of claim 1 including a plurality of generally U-shaped first track members provided along a floor of said container of a size to receive a tire of the at least one vehicle.

15. The transport container of claim 14 wherein said track members are generally parallel.

16. The transport container of claim 15 including second generally U-shaped track members which extend transversely to said first track member.

17. The transport container of claim 6 including at least one secondary access door mounted in one of said opposite side walls of said container, said at least one secondary access door being pivotally mounted at a first pivot axis adjacent said bottom wall so as to be moveable from a first raised and closed position to a second lowered and outwardly extending position, said at least one secondary access door being functional as a loading ramp when in said second lowered position.

18. The transport container of claim 17 wherein said at least one secondary access door includes a second pivot axis spaced from the first pivot joint wherein when said at least one secondary access door is in the lowered and outwardly extending position, a first segment thereof extends generally horizontally and a second segment thereof extends angularly downwardly from said second pivot axis.

19. The transport container of claim 18 wherein said at least one secondary access door includes an outer segment pivotally connected by a third pivot axis to said second segment.

20. An enclosed transport container for use with a vehicle transport trailer having an upper deck for selectively supporting a plurality of automotive vehicles and a lower vehicle supporting deck and wherein the trailer includes hitch means for connecting to a motorized tractor, the enclosed transport container being configured to be positioned along the lower vehicle supporting deck, and including front, rear and opposite side walls and upper and lower walls defining a generally fully enclosed space in which at least one vehicle may be stored and protected from ambient conditions when in use, said container including at least one access door of a size to permit the at least one vehicle to ingress and egress the enclosed space, and said container includes a storage compartment extending forwardly of said front wall thereof of a size to be cooperatively received within an open frame goose neck portion of the trailer.

21. The transport container of claim 20 including at least one door in a side wall of said storage compartment.

22. A vehicle transport trailer comprising, an open framework including an upper deck for selectively supporting a plurality of automotive vehicles and a lower vehicle supporting deck, hitch means at a front portion of the trailer for connecting to a motorized tractor, an enclosed transport container carried on the lower vehicle supporting deck, said transport container including front, rear and opposite side walls and upper and lower walls defining a generally fully enclosed space in which at least one vehicle may be stored and protected from ambient conditions when the trailer is in use, said enclosed transport container including at least one access door of a size to permit the at least one vehicle to be loaded and off loaded from the enclosed space, vehicle tie-down means provided within the enclosed space for securing the at least one vehicle within the enclosed space, and said front portion of the trailer including an open frame goose neck portion, said container including a storage compartment extending forwardly of said front wall thereof of a size to be cooperatively received within said open frame goose neck portion of the trailer.

23. The vehicle transport trailer of claim 22 wherein the trailer includes a rear portion, said at least one access door being in said rear wall of said enclosed transport container, track means mounted within an upper portion of said container, said at least one access door including rollers guidingly mounted within said track means so that said at least one access door may be moved from a lowered closed position to a raised open position, and latch means for securing said at least one access door in said lowered closed position.

24. The vehicle transport trailer of claim 23 wherein said track means includes a first substantially vertical run adjacent to said rear wall of said container and a second substantially vertical run spaced inwardly of said container spaced from said rear wall thereof such that when said at least one access door is positioned within said first substantially vertical run in said lowered position, said enclosed space within said container defines a first volume and when said at least one access door is in said second substantially vertical run said enclosed space within said container defines a second volume which is less than said first volume.

25. The vehicle transport trailer of claim 23 wherein said at least one access door is moveable to vary an effective vehicle load space within said lower supporting deck exteriorly of said container while concurrently changing a volume defined by said enclosed space.

26. The vehicle transport trailer of claim 22 wherein said container includes roller elements for permitting said container to be rolled into a loaded position on said lower supporting deck of the trailer.

27. The vehicle transport trailer of claim 22 including winch means and means for adjustably mounting said winch means within said container.

28. The vehicle transport trailer of claim 23 including at least one secondary access door mounted in at least one of said opposite side walls of said enclosed transport container, said at least one secondary access door being pivotally mounted at a first pivot axis adjacent of said lower wall so as to be moveable from a first raised and closed position to a second lowered and outwardly extending position, and said at least one secondary access door being functional as a loading ramp when in said second lowered and outwardly extending position.

* * * * *